United States Patent [19]

Greenslade

[11] Patent Number: 5,088,869
[45] Date of Patent: Feb. 18, 1992

[54] THREAD ROLLING SCREW

[76] Inventor: Joe E. Greenslade, P.O. Box 330865, Ft. Worth, Tex. 76163

[21] Appl. No.: 645,240

[22] Filed: Jan. 24, 1991

[51] Int. Cl.⁵ .................................................. F16B 25/00
[52] U.S. Cl. ........................................ 411/386; 411/418
[58] Field of Search ................ 411/386, 387, 412, 413, 411/417, 418, 426

[56] References Cited

U.S. PATENT DOCUMENTS

| | | |
|---|---|---|
| 429,851 | 6/1990 | Ericson . |
| 2,093,171 | 9/1937 | Olson . |
| 2,096,937 | 10/1937 | McManus . |
| 2,292,195 | 8/1942 | Brown . |
| 2,624,228 | 1/1953 | Brown . |
| 3,339,952 | 9/1967 | Beckman . |
| 3,370,501 | 2/1968 | Ansingh ............................ 411/387 |
| 3,446,262 | 5/1969 | Phipard . |
| 4,040,328 | 8/1977 | Muenchinger . |
| 4,315,340 | 2/1982 | Veldman . |
| 4,486,135 | 12/1984 | Kazino ................................ 411/387 |
| 4,973,209 | 11/1990 | Essom et al. ..................... 411/387 |

OTHER PUBLICATIONS

TR-3 PSN Thread Rolling Screw, High Performance Thread Rolling Screw with Measurable Differences. Square-Flo will meet it!, National Lock Fasterners, Division of Keystone Consolidated Industries, Inc. Rockford Ill. 61101.

Primary Examiner—Neill R. Wilson
Attorney, Agent, or Firm—James E. Bradley

[57] ABSTRACT

A thread rolling screw has a continuous helical set of threads formed on a body. The threads have a tip section, an intermediate section, and a final section. In the tip and intermediate sections, the diameters of the crests progressively increase. In the intermediate section, relieved areas are spaced apart around the crests of the threads. In the final section, the threads are continuous and circular and of constant diameter. The crest of the last intermediate thread is the same diameter as the crests of the final thread section.

1 Claim, 1 Drawing Sheet

1

THREAD ROLLING SCREW

BACKGROUND OF THE INVENTION

1. Field of the Invention

This invention relates in general to threaded fasteners, and in particular to a screw that forms threads as it is inserted into a hole.

2. Description of the Prior Art

A thread rolling screw is a fastener that has threads specially configured so that it will form threads as it enters a hole. There are several types. One type has a cross section that resembles a triangle with rounded corners. Only three points on the screw thread will be at full diameter. The spaces of lesser diameter between these points reduce the torque required to rotate the screw into the hole. A disadvantage is that it does not provide the full holding strength of a screw that has a continuous circular full diameter thread.

Another type utilizes a tip portion with a plurality of threads of increasingly larger diameter. These threads are not continuously circular. That is, one or more recesses or relieved areas will be located on the crest of each thread. These recessed areas reduce friction during the process of installing the fastener in the hole. The reduced friction reduces the torque. While workable, it would still be desirable to further reduce the torque, yet provide good holding strength. Also, the type having a single large notch extending up the first few threads tends to create chips when forming the threads in the hole. Loose chips can create problems with electronic equipment.

SUMMARY OF THE INVENTION

In this invention, the screw has an intermediate section of threads and a final section of threads. In the intermediate section, the crests have major diameters that progressively increase toward the head of the screw. Also, the crests are not continuous circular threads. Rather, each crest has a plurality of relieved areas spaced circumferentially around the crests. These relieved areas are a lesser diameter than the major diameter.

The final section has crests with constant major diameters. Also, in the final section, the crests are continuous circular threads without any relieved areas. At least one thread of the intermediate section adjoining the final section has a diameter that is the same as the diameter of the final section.

Also, the screw has a tip section with at least one thread. In the tip section, the crest has a major diameter that is smaller than the smallest crest of the intermediate section. The crest in the tip section, however, is not relieved by relief areas. Rather, it is a continuous uninterrupted generally circular form.

DETAILED DESCRIPTION OF THE INVENTION

Figure 1:
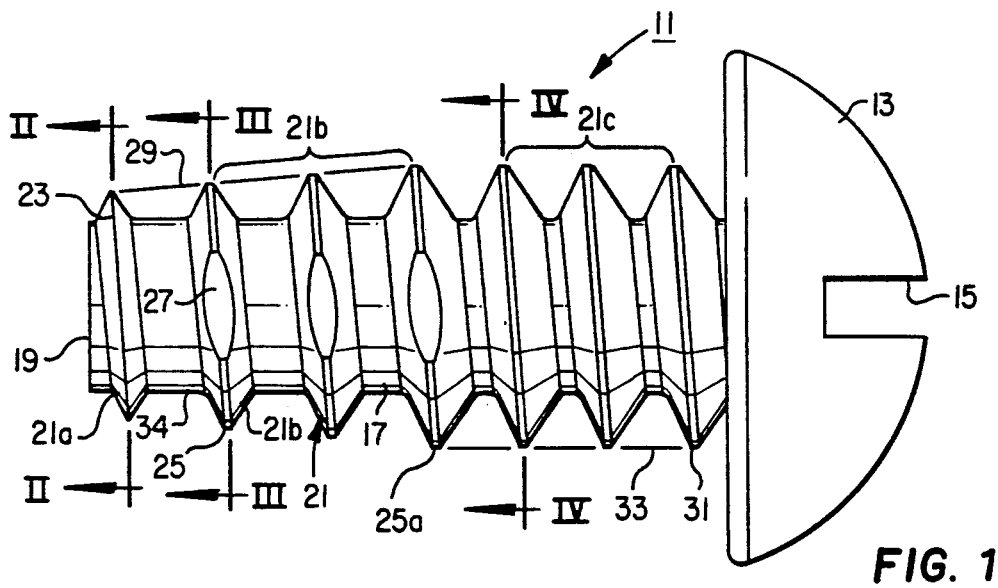
FIG. 1 shows a side elevational view of a screw constructed in accordance with this invention.

Referring to FIG. 1, screw 11 is a thread rolling screw. It self taps into a hole, forming threads in the workpiece as it is rotated. Screw 11 has a head 13 that may be of various types. Head 13 is shown to have a slot 15. However, it could also be hexagonal, or have a Phillips head.

Screw 11 has an elongated shank or body 17. Body 17 has a tip 19 on the end opposite the head 13. A plurality of threads 21 are formed on body 17. Threads 21 comprise a single, continuous helical thread that is of a single start.

Threads 21 are divided into three sections on the screw 11. Tip section 21a consists of at least one thread located at the tip 19. Intermediate section 21b comprises a plurality of threads extending from the tip section thread 21a toward the head 13 a selected distance. Final section 21c comprises a plurality of threads. The final section threads 21c extend from the end of the intermediate threads 21b to the termination of the threads 21. In the embodiment shown, the threads 21 terminate at the head 13.

Figure 2:
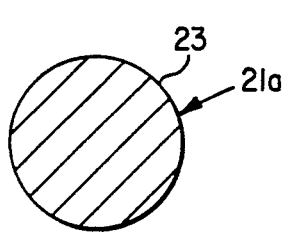
FIG. 2 is a sectional view of the screw of FIG. 1, taken along the line II—II of FIG. 1

The threads 21 all have conical flanks that intersect at an apex or sharp crest. The tip section crest 23 is shown in cross section in FIG. 2. Tip section crest 23 is continuous, sharp and uninterrupted. Although it may be slightly irregular in shape, preferably it is circular as shown. The major diameter of tip section crest 23 is the smallest of all of the crests of the threads 21.

Figure 3:
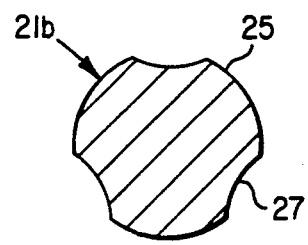
FIG. 3 is a sectional view of the screw of FIG. 1, taken along the line III—III of FIG. 1.

The intermediate section crest 25 is also sharp and circular. However, each intermediate section crest 25 is interrupted by a plurality of recessed areas 27. As illustrated in FIG. 3, there are preferably three recessed areas, each spaced equally around the circumference of each intermediate section crest 25. Each recessed area 27 is generally concave and of reduced major diameter from the major diameter of the intermediate section crests 25. The recessed areas 27 are spaced 120 degrees apart from each other.

As illustrated in FIG. 1 by the line 29, the major diameters of the intermediate section crests 25 increase progressively from the tip section crest 23 toward head 13. Each major diameter of each intermediate section crest 25 is greater in diameter than the tip section crest 23. Also, each intermediate section crest 25 is slightly greater in diameter than the intermediate section crest 25 on the tip side. This provides a taper to the screw 11.

The last intermediate section crest 25 will be the largest in major diameter. The major diameter of the last intermediate section crest 25a is the full diameter of the screw 11. There could be more than one thread in the intermediate section 21b having a full diameter crest 25a, but preferably only one of the intermediate threads 21b has this full diameter crest.

Figure 4:
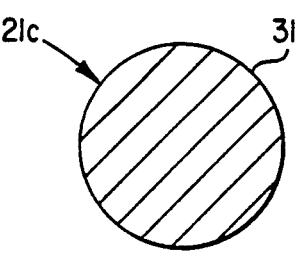
FIG. 4 is a sectional view of the screw of FIG. 1, taken along the line IV—IV of FIG. 1.
Figure 5:
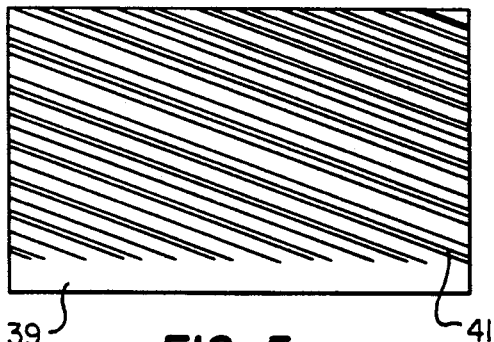
FIG. 5 is a front view of part of a thread rolling die for use in forming the thread of the screw of FIG. 1.
Figure 6:
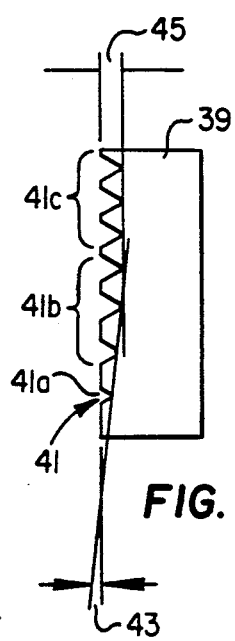
FIG. 6 is a side view of the thread rolling die of FIG. 5.
Figure 7:
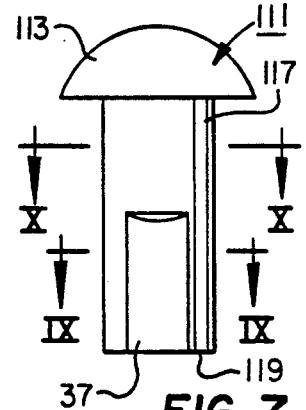
FIG. 7 is a side elevational view of a blank used to form the screw of FIG. 1.

The final section crests 31 are sharp, continuous, circular crests, as illustrated in FIG. 4. The final section crests 31 are not interrupted by any recessed areas, such as the recessed areas 27 of the intermediate section crests 25. The final section crests 31 are of constant major diameter. Line 33 illustrates the constant diameter through the final thread section 21c, and also including the last intermediate section crest 25a.

The body 17 has a minor diameter, which is the root 34 between each of the threads 21. This minor diameter is cylindrical and constant throughout the entire length of the body 17. The diameter of the root 34 is the same in the tip section 21a, intermediate section 21b and final section 21c. As a result, the depth of the threads in the intermediate section 21b will progressively be greater than the depth of the tip section 21a. Also, the depth of the final threads 21c will be greater than all of the intermediate threads 1b, except the adjoining crest 25a.

FIGS. 5-8 illustrate the process for forming screw 11. First, a blank 111 will be formed. To avoid confusion, the components of blank 111 that correlate to the finally formed screw 11, but are shown in a preformed stage, will be illustrated with the numeral "1" preceding each element. Blank 111 has a cylindrical shank or body 117. Body 117 terminates in a tip 119. Blank 111 will have a head 113 of selected type.

Figure 9:
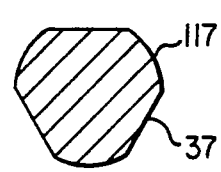
FIG. 9 is a sectional view of the blank of FIG. 7, taken along the line IX-IX of FIG. 7.
Figure 10:
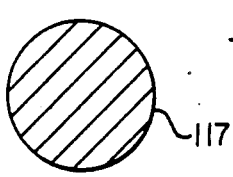
FIG. 10 is a sectional view of the blank of FIG. 7, taken along the line X—X.
Figure 8:
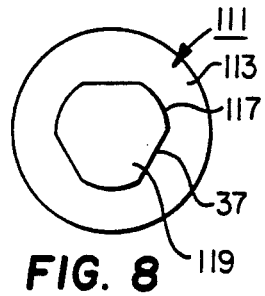
FIG. 8 is an end view of the blank of FIG. 7.

Flattened areas 37 will be then formed on body 117. Each flattened area 37 is a straight indentation extending from tip 119 toward head 113. The length of the flattened area 37 will be the length from tip 19 to the last intermediate crest 25a, as illustrated in FIG. 1. FIGS. 8 and 9 illustrate how the flattened areas 37 will eventually become the recessed areas 27 of FIG. 1. As shown in FIG. 10, the portion of the body 117 from the end of the flattened area 37 to the head 113 will be cylindrical.

A pair of mating thread rolling dies 39 will be provided (only one shown). Each thread rolling die 39 is a flat plate. It contains a number of straight grooves 41 formed on one face. Each groove 41 is a triangular, parallel groove. The grooves 41 are divided into a tip groove 41a, a plurality of intermediate grooves 41b, and a plurality of final grooves 41c. The depths of the grooves 41 vary. As illustrated by the angle 43 and the final depth 45, the tip groove 41a has the least depth. The intermediate grooves 41b have progressively increasing depths. The last intermediate groove 41b is of the full depth 45. The final grooves 41c are of uniform full depth 45.

In a conventional manner, the thread rolling dies 39 will be moved relative to each other, with the body 117 sandwiched between under pressure. This movement cause the body 117 to roll and be deformed by the grooves 41. The deformation will result in the helical thread sections 21a, 21b and 21c (FIG. 1).

The cylindrical portion of body 117 and the uniform depth 45 results in constant diameter final threads 21c. The surface of the rolling die 39 between the grooves 41 is located in a single plane that is parallel to the plane that passes through the roots of each of the final grooves 41c. This results in a constant minor diameter for the roots 34 (FIG. 1). The shallow depth of the tip groove 41a results in a continuous, sharp, generally circular crest 23, although some irregularity due to the flattened areas 37 may result. The greater depth in the intermediate groove 41b and the flattened areas 37 result in the recessed areas 27 of FIG. 1.

In use, the hole (not shown) of the workpiece into which the screw 11 is to be inserted will be only slightly greater than the diameter of the tip crest 23. As the screw 11 is rotated, the hole will enlarge. The recessed areas 27 will reduce friction, and thus the torque as the screw 11 is rotated. The recessed areas also allow the material of the workpiece to flow. The full diameter of the hole will be reached once the last intermediate crest 25a engages the workpiece.

The recessed area 27 on this last intermediate crest 25a reduces the torque and friction during the final enlarging stages. Once the hole has reached the full enlarged diameter, the torque to complete the entry of the screw will not be high. The full circular diameters of the final section 21c will provide the necessary strength to hold the screw 11 in place.

The invention has significant advantages. The screw requires less torque to install than prior art thread rolling screws. The screw is easier to machine than many prior art thread rolling screws. Although less torque is required, the holding strength is not sacrificed.

While the invention has been shown in only one of its forms, it should be apparent to those skilled in the art that it is not so limited, but is susceptible to various changes without departing from the scope of the invention.

I claim:

1. A thread rolling screw, comprising in combination:
a body having a head on one end;
a continuous helical set of threads formed on the body and divided into tip, intermediate, and final sections;
the tip section having at least one thread located on an end opposite the head which has a crest that is continuously sharp and has a major diameter;
the intermediate section having a plurality of threads which have intermediate section crests having major diameters that are greater than the major diameter of the crest of the tip section and which progressively increase from the tip section to the final section, the intermediate section crests being circular but interrupted by circumferentially spaced apart relieved areas of lesser diameter than the major diameters of the intermediate section crests;
the final section having a plurality of threads which have final section crests having major diameters that are continuously circular and constant in major diameter, the intermediate section crest that adjoins the final section having a major diameter that is the same as the major diameter of the final section crests; and
the body having a minor diameter that is constant throughout its length.

* * * * *